United States Patent
Sears (10) Patent No.: US 12,408,573 B1
(45) Date of Patent: Sep. 9, 2025

(54) VERTICAL TILLER

(71) Applicant: Richard B. Sears, San Rafael, CA (US)

(72) Inventor: Richard B. Sears, San Rafael, CA (US)

( * ) Notice: Subject to any disclaimer, the term of this patent is extended or adjusted under 35 U.S.C. 154(b) by 645 days.

(21) Appl. No.: 17/882,220

(22) Filed: Aug. 5, 2022

Related U.S. Application Data (60) Provisional application No. 63/229,733, filed on Aug. 5, 2021.

(51) Int. Cl.
*A01B 33/06* (2006.01)
*A01C 5/02* (2006.01)
*E21B 11/00* (2006.01)

(52) U.S. Cl.
CPC ............. *A01B 33/06* (2013.01); *A01C 5/02* (2013.01); *E21B 11/005* (2013.01)

(58) Field of Classification Search
CPC ......... A01B 33/06; A01B 33/022; A01B 1/16; A01B 35/28; A01B 45/026; A01B 1/14; A01B 1/065; A01B 1/00; A01C 5/02; E21B 11/005; E21B 10/44
See application file for complete search history.

(56) References Cited

U.S. PATENT DOCUMENTS

| | | | | |
|---|---|---|---|---|
| 1,363,444 A | * | 12/1920 | Van Den Heuvel | A01B 35/28 404/124 |
| 3,094,178 A | | 6/1963 | Newbold | |
| 4,074,780 A | * | 2/1978 | Gilbert | E21B 10/44 175/323 |
| 4,986,368 A | * | 1/1991 | Underwood | E21B 10/44 172/430 |
| 5,133,269 A | * | 7/1992 | Charneski | A01C 5/02 175/21 |
| 5,716,132 A | | 2/1998 | Chou | |
| 5,810,093 A | | 9/1998 | Howard | |
| 6,119,787 A | * | 9/2000 | Garcia | E21B 7/005 172/25 |
| 6,227,317 B1 | | 5/2001 | Severns | |
| 6,955,227 B1 | * | 10/2005 | Motosko | B01F 27/1143 172/111 |
| 8,479,842 B2 | | 7/2013 | Tucceri | |

(Continued)

*Primary Examiner* — Christopher J Sebesta
*Assistant Examiner* — Blake E Scoville
(74) *Attorney, Agent, or Firm* — Steven A. Nielsen; www.NielsenPatents.com (57) ABSTRACT

A vertical tiller comprises a rider disc or foot at the bottom of a helix or screw/auger, with the assemble further comprising angled winged appendages having angled sweep sections. The assembly further comprises a turned leading appendage. The turned leading appendage keeps the assembly relatively vertical to prevent the other appendages from fouling, cutting or entangling with cloth, wire or other elements often found at the bottom of planting pots, wire baskets and planting beds. The vertical tiller performs maceration and aeration within soil and provides a level of safety by the angled appendages that bounce off of a user's foot. The invention is well suited for remixing and amending soil and is intended for light soils having minimal rocks and large roots. The disclosed wing design assists having greater control over the tiller which is useful in selective tilling to promote soil biota.

5 Claims, 6 Drawing Sheets

(56) References Cited

U.S. PATENT DOCUMENTS

| | | | | |
|---|---|---|---|---|
| 2002/0175005 A1* | 11/2002 | Chou | .................. | A01B 1/00 |
| | | | | 175/385 |
| 2007/0086271 A1 | 4/2007 | Hamilton | | |
| 2008/0135267 A1* | 6/2008 | Karczewski | ............ | A01B 1/14 |
| | | | | 172/378 |
| 2009/0110502 A1 | 4/2009 | Brooks | | |

* cited by examiner

VERTICAL TILLER

CROSS-REFERENCE TO RELATED APPLICATIONS

This utility patent application claims the benefit and priority date of U.S. application 63/229,733 filed on Aug. 5, 2021, the contents of which are incorporated herein as if restated herein.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to soil mixing systems. More particularly, the invention relates to means and methods of mixing soil in cloth pots and wire mesh planting beds.

(2) Description of the Related Art

The known related art fails to anticipate or disclose the principles of the present invention.

In the related art, general mixing blade systems are known, but don't perform well in cloth pots or wire mesh planting beds. The known prior art fails to protect a user's foot and fails to protect cloth, wire mesh or other materials sometimes used to surround a planting pot or planting bed.

Thus, there is a need in the art for the presently disclosed embodiments.

BRIEF SUMMARY OF THE INVENTION

The present invention overcomes shortfalls in the related art by presenting an unobvious and unique combination and configuration of methods and components to construct and use a vertical tiller having a helical blade system and rounded disc button bottom and wherein the wings, appendages or blades are canted to avoid damage to a soil container or operator of the system. Disclosed embodiments may have one or more helixes with each helix having one or more wings. The wings may have edges of various degrees of smoothness. The wings may be attached, stamped, welded or forged on a helix at any angle. The disclosed wings overcome various shortfalls in the prior art in that the wings provide controlled movement of the tiller when the tiller is tilted. The sweeping distal edges of the wings provide a good purchase upon the ground to move or walk the tiller in a desired location. The maneuverability of the disclosed embodiments allows a user selectively till discrete portions of a planting bed and to leave portions undisturbed when in turn promotes and preserves soil biota. The indiscriminate tilling of the related art encourages tilling of an entire plant bed, which is detrimental to soil biota.

The disclosed embodiments may also include a turned leading wing that presents a horizontal leading surface to the ground so as to prevent injury to a user and to prevent damage to an underlayment such as cloth, wire mesh and other products found at the bottom of or surrounding a planting pot or planting bed. Such planting materials are sometimes collectively referred to as "fabric" and may further include wire mesh, weed barrier or any material used for farming and gardening.

The disclosed embodiments are useful in mixing soil, amending soil, root cutting, adding fertilizer to soil and other uses. The disclosed embodiments are useful in pots with fabric on the bottom, gopher wire and other applications wherein fragile or delicate components are present.

The disclosed embodiments provide superior maceration and aeration to soil by use of the disclosed sweeping angled winged appendages.

These and other objects and advantages will be made apparent when considering the following detailed specification when taken in conjunction with the drawings.

REFERENCE NUMERALS IN THE DRAWINGS

100 a disclosed embodiment in general
120 means of attachment to a rotational force
200 tiller assembly
210 shaft
220 helix
222 outer edge of helix
226 inner edge of helix
230 wing or appendage
232 sweeping distal edge of wing
235 cambered transition between sweeping edge 232 and first vertical return 237
237 first vertical return from helix to cambered transition 235
239 second vertical return from normal edge 243 of wing to helix
243 normal edge or transition between sweeping edge 232 of wing to second vertical return 239
250 turned leading wing
255 distal edge piece of turned leading wing 250
300 rider disc or button
320 lower circular surface of rider disc
330 outer circular wall of rider disc 300

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the IDS references and U.S. patents and applications are incorporated herein by reference. Aspects of the invention can be modified, if necessary, to employ the systems, functions and concepts of the various patents and applications described above to provide yet further embodiments of the invention.

Figure 1:
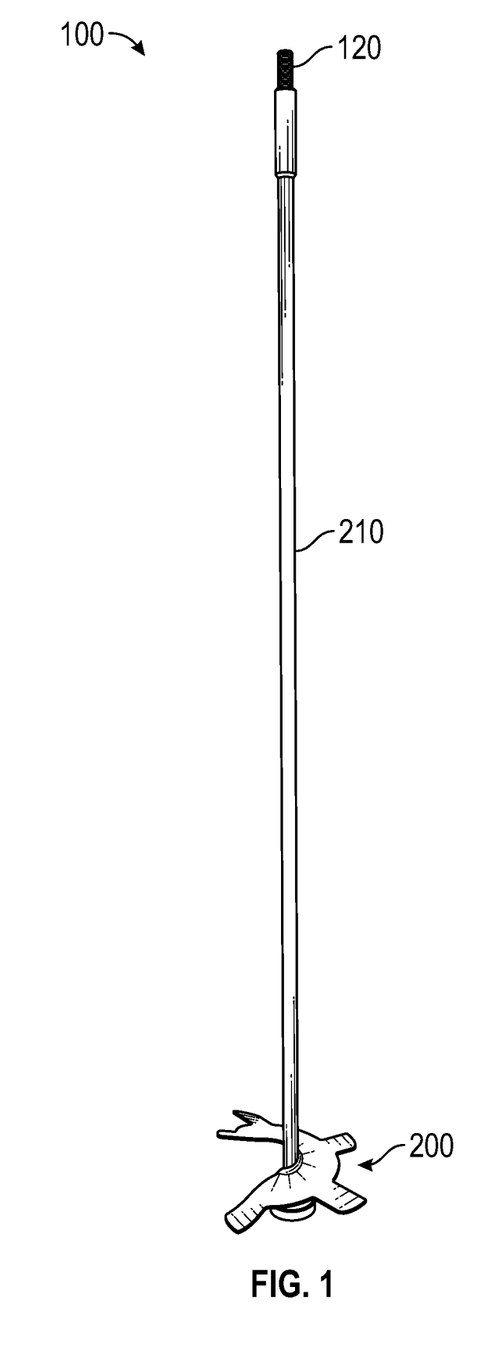
FIG. 1 depicts a perspective view of a disclosed embodiment

FIG. 1 depicts a disclosed embodiment 100 in general which may comprise a shaft 210, one or more tiller assemblies 200. A top section of the shaft may comprise means of attachment to a rotational power source such as a power head. Means of attachment may include a chuck and/or a threaded rod.

Figure 2:
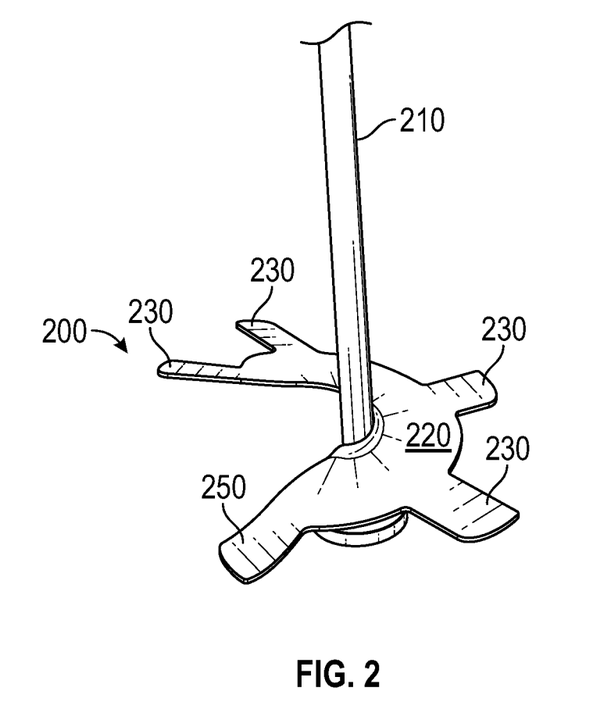
FIG. 2 depicts a perspective view of a disclosed tiller assembly
Figure 8:
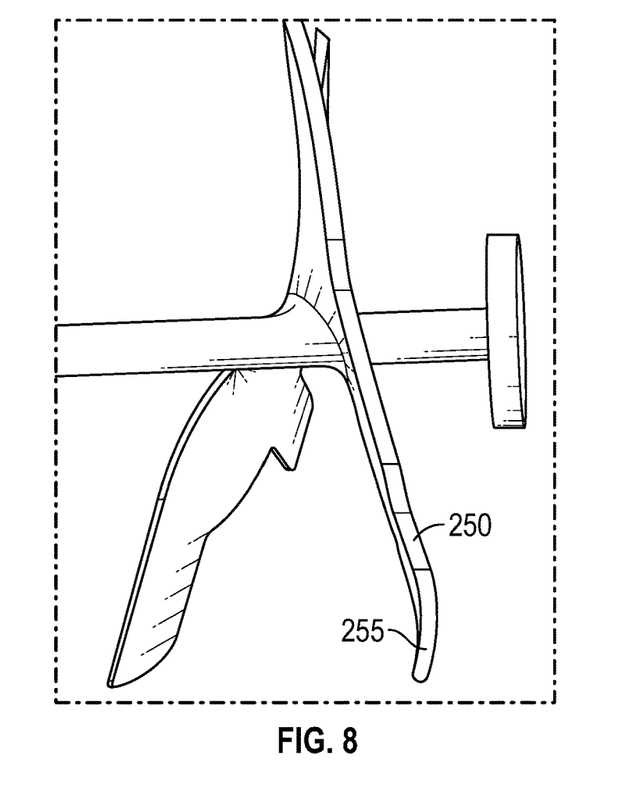
FIG. 8 depicts an enlarged and perspective view of a turned leading wing

FIG. 2 depicts a helix assembly 200 comprising one or more wings 230 with a lower section of the helix 220 comprising a turned leading wing 250. The turned leading wing overcomes shortfalls in the related art as the turned leading wing is the lowest of the wings and comprises a distal edge piece, as shown in FIG. 8 as reference number 255. The distal edge piece 255 may have an upward angle in the range of 10 to 35 degrees from the base section of the turned leading wing. This angle presents the distal edge piece as a relatively flat member when the helix assembly veers from a vertical position. Thus, the distal edge piece keeps the helix assemble from auguring into the area to be tilled when the assemble veers to a side. Also, the distal edge piece overcomes shortfalls in the prior art by presenting a flat surface to the ground and thus not cutting, tearing or otherwise damaging cloth, wire or other material that is often found in planting pots and planting beds. The distal edge piece also protects the foot of a user by being relatively flat when the tool is tilted, thus not cutting the foot of the user. While the disclosed embodiments are designed to be used in vertical position, it is reasonably forceable for a user to allow the tool to become tilted during use. Inconsistencies in soil, the existence of dirt clots and possible fluctuations in torque from the rotational power source located at the top of the tool further increase the chances of the tool becoming tilted during use.

Figure 3:
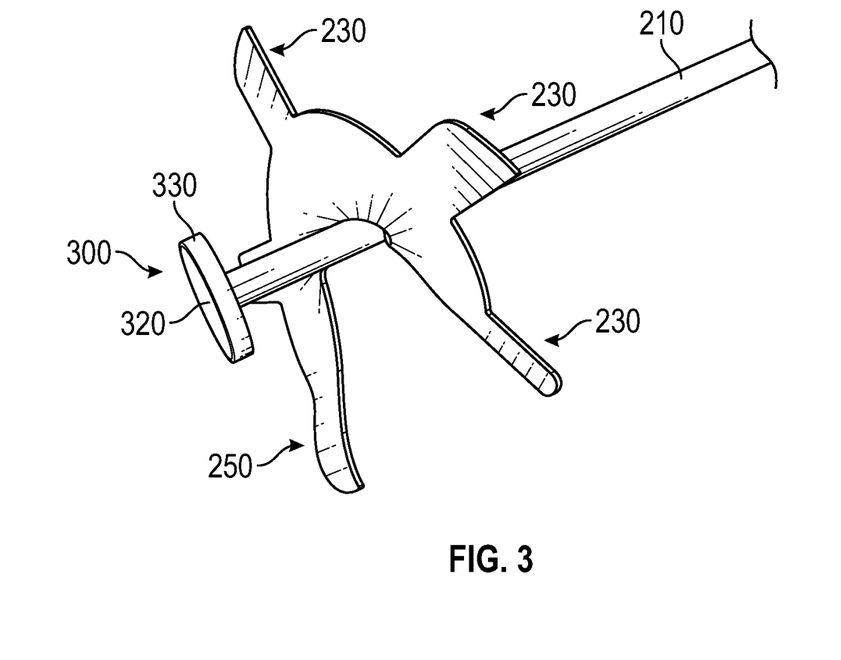
FIG. 3 depicts a perspective view of a disclosed tiller assembly

FIG. 3 features the disclosed rider disc 300 which may be disposed at the inferior or lower end of the shaft 210. The rider disc may comprise a lower circular surface 320 and an outer circular wall 330. The rider disc, so configured overcomes shortfalls in the known prior art as the rider disc may ride upon cloth, weed fabric, steel mesh and other materials often found at the bottom of or within a planting. The lower flat circular surface 320 and outer circular wall 330 allow the rider disc to overcome shortfalls in the known prior art by not providing means of become ensnared by or damaging fabric. The flat and circular surfaces of the rider disc provide the best means of supporting the helix assembly over fabric such that the wings are elevated and thus unlikely to damage the fabric. As the rider disc is smooth, flat and round, the rider disc has no sharp edges to damage the fabric.

Figure 4:
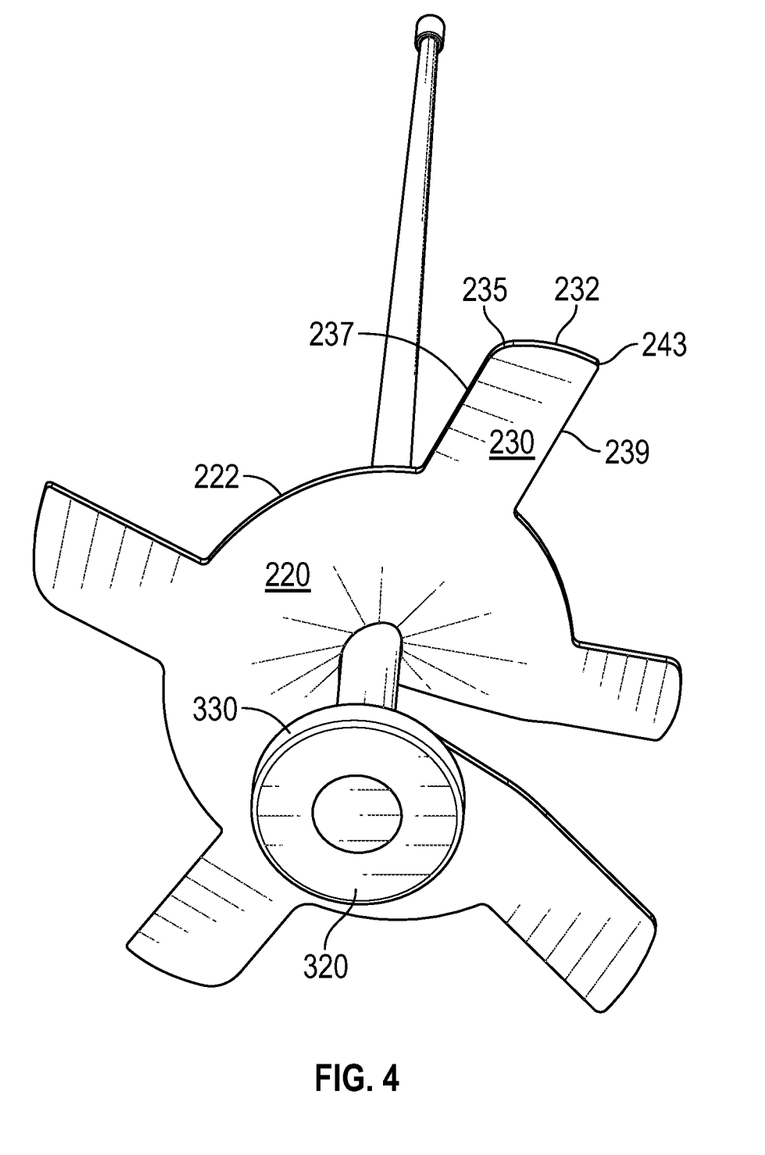
FIG. 4 depicts a perspective view of a disclosed tiller assembly

FIG. 4 shows a lower view of the rider disc as discussed above but also shows the useful features of the wings 230 that allow the wings to mix and or circulate soil and to provide maceration and aeration functions without damaging fabric. A wing 230 may comprise or be defined by a first vertical return or edge 237 that starts at an outer edge 222 of the helix 220. The first vertical edge may then become or disposed upon a cambered corner or cambered transition 235 or cambered junction. The cambered edge 235 may then transition to or be disposed upon a sweeping outer edge 232, the other end of the sweeping outer edge may then be disposed upon or become a sharp angle or angle in the range of 80 to 110 degrees and may be defined as a normal transition 243. The normal transition may then become or be disposed upon a second vertical return 239 which ends or is further defined by an outer edge of the helix.

The architecture of the disclosed wings overcome shortfalls in the art by providing a side or lateral surface, when the tiller is tilted, such that the wings provide propulsion or movement or "walk" to the tiller which allows a user to steer the tiller to perform tilling upon selected areas of a grow area so as to not mix or disturb the entire grow area. By mixing just parts of a grow area, the existing soil biota may be preserved and then cultivated to the rest of the mixed grow area.

The artful combination of components and curvatures of the disclosed wings overcome shortfalls in the known related art as the helix may be rotated such that the cambered edge 235 becomes the first point of contact with fabric that happens to be above the rider disc or turned leading wing 250 The fabric is not likely to tear due to the cambered shape of the leading edge of the wing. Fabric is further protected and less likely to tear due to the sweeping or curved outer surface of the sweeping distal edge 232 of the wing. The sweeping distal edge gently guides the fabric off of the wing and helix. The first vertical return 237 is shorter than the second vertical return 239 to ensure that any involved fabric is gently moved or urged away from the helix during rotation.

The turned leading wing 250 has similar features of the other wings 230, with the exception, as discussed above, of having a distal edge piece angled to provide flat support upon the ground when the tool is tilled. The distal edge piece protects a user's feet from injury, and also protects fabric as the bottom side of the distal edge piece is relatively flat with respect to any underlying or contained fabric.

Figure 5:
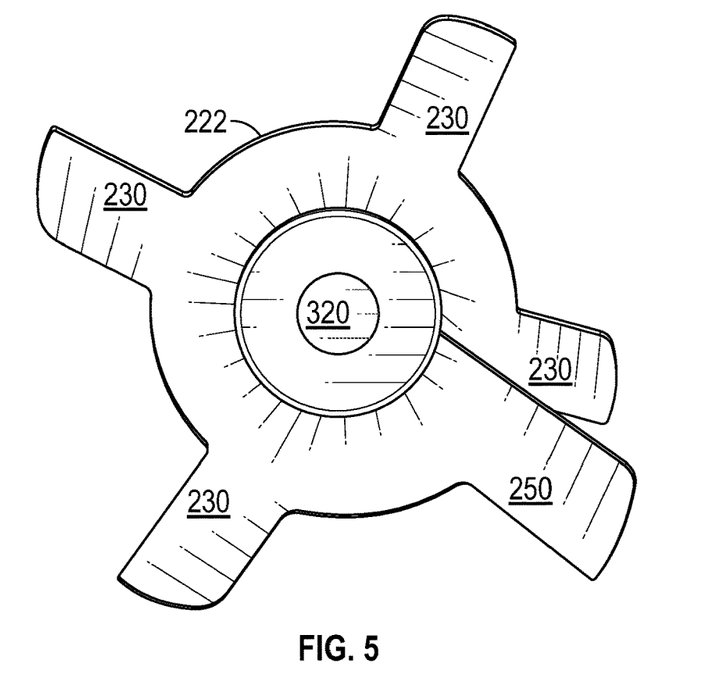
FIG. 5 depicts a bottom perspective view of a disclosed tiller assembly

FIG. 5 shows the helix assembly from the bottom and how the turned leading wing 250 is at the bottom of the helix as compared to the plurality of wings 230.

Figure 6:
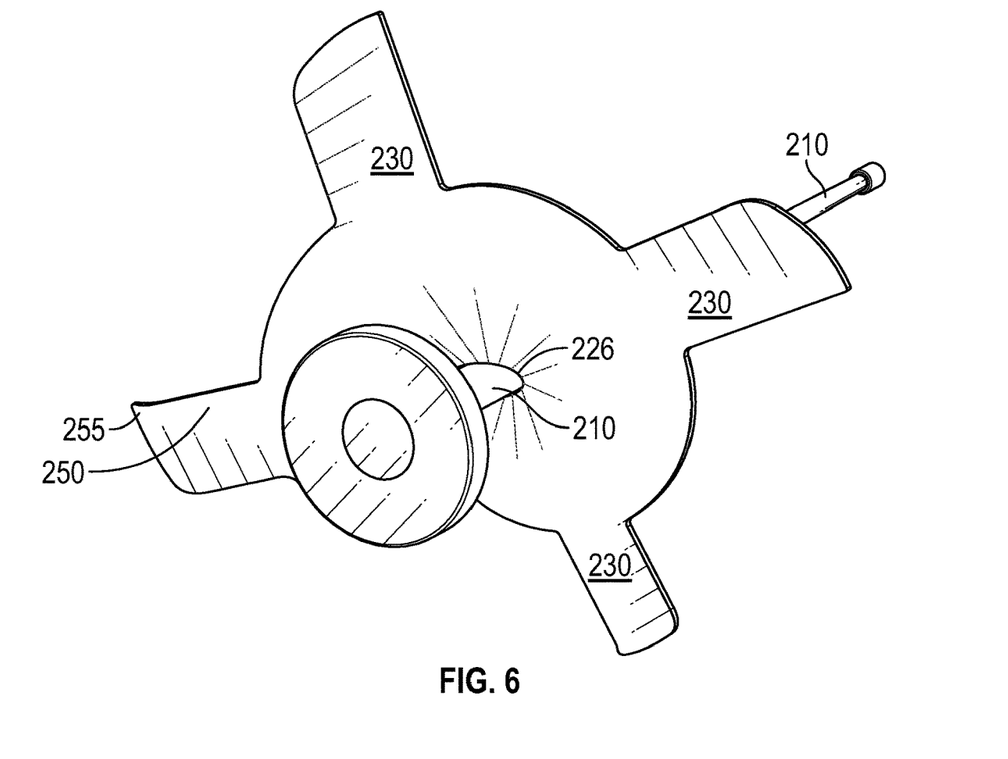
FIG. 6 depicts a bottom and side perspective view of a disclosed tiller assembly

FIG. 6 shows the distal edge piece 255 disposed at the distal end of the turned leading wing 250. The shaft is shown in attachment to an inner edge 226 of the helix.

Figure 7:
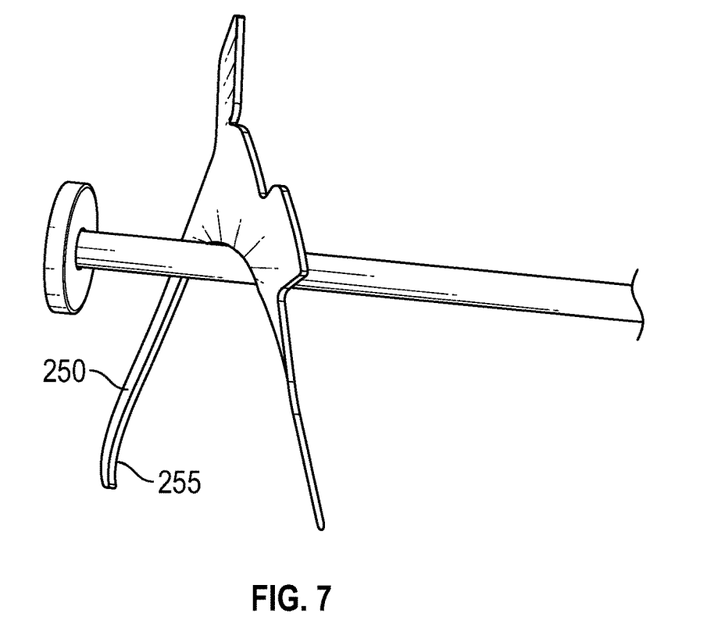
FIG. 7 depicts a side perspective view a disclosed tiller assembly

FIG. 7 shows the features of the turned leading wing 250 as discussed above.

FIG. 8 shows how the distal edge piece 255 of the turned leading wing is angled in a relatively upward direction.

Figure 9:
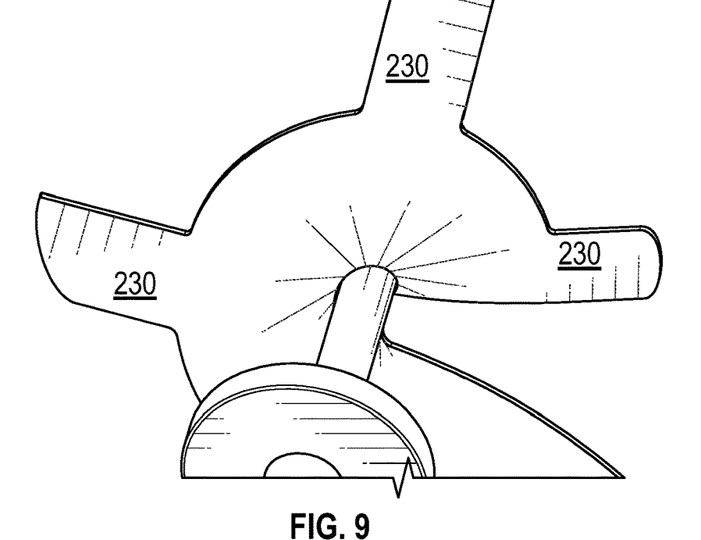
FIG. 9 depicts an enlarged and perspective bottom view of a disclosed tiller assembly

FIG. 9 depicts lower portions of a helix assembly.

Figure 10:
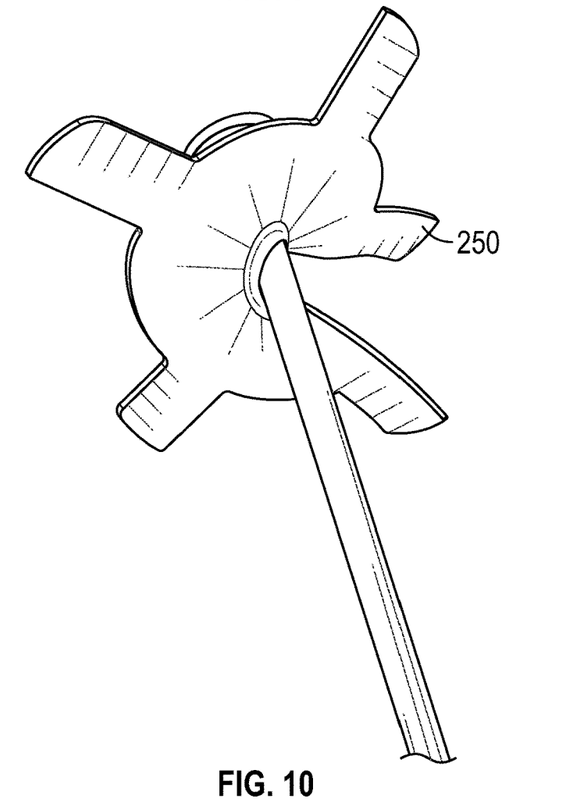
FIG. 10 depicts a top view of a disclosed tiller assembly

FIG. 10 provides a top view of a helix assembly.

In the best mode known to date, the helix and the wings are disposed at an angle in the range of 4 to 20 degrees.

What is claimed is:

1. A system (100) for mixing soil while protecting underlying weed fabric, the system comprising:
    a) a tiller assembly comprising a helix (220) the helix comprising a plurality of wings (230) with each wing comprising a first vertical return (237) attached to an outer edge (222) of the helix, the first vertical return also attached to a cambered transition (235) with the cambered transition attached to a sweeping distal edge (232) with the sweeping distal edge attached to a normal edge (243) with the normal edge attached to a second vertical return (239) with the second vertical return attached to the outer edge of the helix;
    b) the helix further comprising a turned leading wing (250) the turned leading wing disposed at the lowest end of the helix, the turned leading wing comprising a distal edge piece (255) in angled attachment to the turned leading wing; and
    c) the tiller assembly centrally attached to a shaft (210) the shaft having an inferior end centrally attached to a rider disc (300) the rider disc comprising a outer circular wall (330) and a lower circular surface (320).

2. The system of claim 1 wherein the shaft further includes an upper end with the upper end having means of attachment to a torque.

3. The system of claim 1 wherein the system comprises a plurality of tiller assemblies attached to the shaft.

4. The system of claim 1 wherein the distal edge piece is attached to the turned leading wing at an angle in the range of 10 to 35 degrees.

5. The system of claim 1 wherein the plurality of wings are attached to the helix at an angle in the range of 4 to 20 degrees.

* * * * *